United States Patent [19]

Rice

[11] Patent Number: 4,987,011
[45] Date of Patent: Jan. 22, 1991

[54] METHOD FOR PRODUCING A SILICON CARBIDE COATED CLAY

[75] Inventor: Camilla A. Rice, Sandersville, Ga.

[73] Assignee: ECC America Inc., Atlanta, Ga.

[21] Appl. No.: 266,783

[22] Filed: Nov. 3, 1988

[51] Int. Cl.$^5$ ............................................... B05D 7/00
[52] U.S. Cl. .................................................. 427/215
[58] Field of Search ........................ 427/215; 423/345; 502/60, 80, 85

[56] References Cited

U.S. PATENT DOCUMENTS 4,381,948  5/1983  McConnell et al. .
4,764,495  8/1988  Rice .

OTHER PUBLICATIONS

Sang Wook Choi et al., Journal of the Korean Ceramic Society, vol. 23(5), 17–24 (1986).
Y. Sugahara et al., Journal of American Ceramic Society, vol. 71, C-325-C-327, Jul. 1988.
C&EN, Feb. 1, 1988, p. 7.
N. N. Ault, and R. G. Robertson, "Silicon Carbide," Ceramic Bulletin, vol. 65 (1986), [5] 741–742.
K. Hunold, H. Reh, Interceram, No. 1, 1988, pp. 35–39.
"Principles of Solid State Chemistry" by P.O. Budnikon and A. M. Ginstling, pp. 373–377, translated by Kenneth Shaw, Copyright 1968, Maclaren & Sons.

*Primary Examiner*—Stanley Silverman
*Attorney, Agent, or Firm*—Klauber & Jackson

[57] ABSTRACT

A layered lattice silicate in particulate form, such as kaolin, which contains naturally occurring organic material useful as a source of carbon or which contains an external source of carbon, is treated at elevated temperature in a hydrogen atmosphere to cause formation of silicon carbide at the surfaces of the particles. The product is an abrasive, useful in industrial products such as abrasive cleaners and sandpaper coatings, or as a filler for ceramics, elastomers and plastics.

7 Claims, No Drawings

METHOD FOR PRODUCING A SILICON CARBIDE COATED CLAY

FIELD OF THE INVENTION

This invention relates generally to clay and clay minerals, including layered lattice silicates such as kaolins. More particularly, this invention relates to a method of producing a silicon carbide coated clay notable for its utility in advanced ceramic applications as a platelet shaped filler. In one aspect of the invention, the products comprise particles of a layered lattice silicate, the surfaces of which are modified by silicon carbide.

The layered silicates to which the invention is applicable are of the type which can be represented by the general formula $E_iM_xSi_yO_n(OH)_m$ where M is Al, Mg, or Fe, $X=2$ to 6; $y=2$ to 8, $n=2$ to 20, $m=0$ to 8, and $E_i$ is one or more exchangeable ions (K, Na, Mg, Ca, Ba, Fe, Li, etc.) These layered silicates will hereinafter in this specification be referred to as "layered lattice silicates".

In this disclosure, the term "surface modified" means that only the surface of the layered lattice silicate is modified and no breakdown of its structure other than that normally associated with heating a kaolin in the range set forth in this document, occurs.

BACKGROUND OF THE INVENTION

It has heretofore been known that in certain instances high temperature reactions of silicate films with hydrogen can be utilized for certain purposes, such as the production of hydroxide-free silica for optical glasses. It is also known to those skilled in the art that products known as "hydrogen clays" can be produced by aqueous reaction of clays with mineral acids, as for example is described in U.S. Pat. No. 3,201,197. Such reactions have substantially no bearing upon the present invention, as will henceforth become evident.

In my U.S. Pat. No. 4,764,495, issued Aug. 16, 1988, there is disclosed a method for producing a layered lattice silicate which is surface-modified with an organic material, by pretreating the silicate such as a kaolin in a hydrogen atmosphere, and then reacting the product with a suitable organic compound. In my application U.S. Ser. No. 943,669 filed Dec. 17, 1986 there is disclosed a method for producing a layered lattice silicate which is surface-modified with an organic material, by contacting the silicate such as a kaolin with an organic monomer, co-monomers, or a prepolymer, and effecting surface polymerization or reaction in situ in the presence of a gaseous hydrogen atmosphere.

In accordance with the foregoing it is an object of the invention to provide a relatively simple and effective process for modifying the surface of a particulate aluminosilicate clay by forming on the surfaces thereof a silicon compound not previously present, from materials native to the clay.

In my application U.S. Ser. No. 114,538 filed Oct. 29, 1987 now U.S. Pat. No. 4,810,580, a clay such as a hydrous kaolin clay, i.e., a kaolin that has not been subjected to calcination at temperatures of 450° C. or higher, can be coated with a silicon nitride layer when reacted at above 1000° C., preferably 1100° to 1500° C., in a gaseous $NH_3$ atmosphere. The novel product is gray in color, will not disperse in organic solvents and is more abrasive than a normal calcined kaolin (reacted in air). ESCA analysis of the silicon nitride coated product displays a split in the silicon peak with the new peak shifting from 105.8 to 106.4 ev. It is theorized that nitridation occurs in situ of the silicon atoms of the clay, which remain bound to the clay in the process, and that the nitridation forms structures comprising Si, N or Si, N, O or Si, Al, O, N.

An article by Sang Wook Choi et al in the *Journal of the Korean Ceramic Society*, vol. 23(5) 17–24 (1986), published on Oct. 30, 1986, describes the synthesis of products named B' sialon from compositions containing kaolin, graphite and metal silicon or aluminum at temperatures in the range of 1300°–1450° C. under a gas of 90% $N_2$-10% $H_2$ for 20 hours. A composition of kaolin and graphite was also treated to give B'-sialon in major amount and $\alpha$-$Al_2O_3$ in minor amount. The graphite functions as a reducing agent and a source of carbon. The reactions are termed carbothermal reduction-nitridation.

An article by Y. Sugahara et al in *Journal of American Ceramic Society*, vol. 71, C-325 to C-327, July 1988, describes the production of silicon carbide and AlSiC materials from montmorillonite.

It is a further object of the invention to provide a relatively simple, inexpensive, and effective process, which enables surface modification of a clay mineral, such as a kaolin clay, by surface carbide groups, thereby providing a new product having valuable commercial applications.

Persons are incorporating ceramic fibers, whiskers, and particulates into ceramics to produce advanced composites, with improved properties such as fracture resistance, strength, and high-temperature stability. Ceramic matrix composites have been made by adding a variety of ceramic particulates, fibers and whiskers (very strong single crystals that are at least 10 times longer than they are thick) to a ceramic matrix to make the ceramic tougher by deflecting cracks. These fillers can dissipate the crack's energy through fractional forces. They also can brace the crack, keeping it from opening further.

Whiskers and particulates are more easily handled than continuous fibers. They can be handled like a fine powder, that being their appearance in bulk form. (They are about 0.5 um in diameter and whiskers are about 40 to 50 um long.) Because of their size, they can be easily mixed into the "batter" from which many ceramic components are fabricated.

The most commonly used whiskers are those made of silicon carbide. They are very strong and have been successfully incorporated into a variety of matrices, including alumina, mullite, zirconia, silicon nitride, and glass ceramics. Many studies have shown that the fracture toughness and/or fracture strength of polycrystalline ceramics can be improved by reinforcing them with single crystal silicon carbide whiskers, see C&EN, Feb. 1, 1988, page 7.

Silicon carbide does not exist in nature and must therefore be synthesized. This is done using pure quartz sand, coke containing a low proportion of ash and additions of sawdust and sodium chloride, the mixture being heated to 2500° C. in an electric resistance furnace. About 6 kg raw material and 4.3 kWh electrical energy are required for 1 kg SiC. Owing to heat losses, however, energy consumption almost doubles—the figure 7.8 kWh/kg shows that this is really an energy-consuming and thus costly process, see N. N. Ault, and R. G. Robertson, "Silicon Carbide," *Ceramic Bulletin*, vol. 65 (1986) 741–742, and The Benecke: Hartstoffe in der Eisen-und Nichteisen Metallurgie, VdEh-Seminar 15/83, Monchengladbach Marz 1983; also *Interceram*, No. 1, 1988, pp. 35–39, an article by K. Hunold, H. Reh, Fed. Rep. Germany.

SUMMARY OF THE INVENTION

Now in accordance with the present invention, the foregoing objects, and others as will become apparent in the course of the ensuing specification, are achieved in a method of treating a layered lattice silicate so that the latter becomes surface modified with silicon carbide.

It has now been found that a silicon carbide coated clay having valuable commercial applications, e.g., as a filler for advanced ceramic materials may be produced by reacting a suitable carbon-containing layered lattice silicate, such as a kaolin, in a hydrogen atmosphere at elevated temperatures.

These fine powdered materials can also serve as polishing media for optical glass.

In one aspect, a method is employed which comprises heating a layered lattice silicate, e.g., kaolin, at high temperature ($>1000°$ C.) in a hydrogen-containing atmosphere in the presence of a carbon source to produce a silicon carbide surface modified calcined kaolin.

The contacting may be conducted in a fluidized bed reactor, with the gaseous components passing upwardly through a suitable diffuser plate, and into a fluidized bed of the particulate material being treated. The contacting may also be conducted in similar apparatus which provides good gas-solids contact—such as a rotary furnace. A flowing gas atmosphere at flow rates of 5 SCFH (standard cubic feet per hour) or higher, is suitable. Useful reaction time is between 5 and 75 minutes.

Various clay and clay minerals may be treated by the method of the invention, which is applicable generally to crystalline layered lattice silicates. Thus, for example, clays of the halloysite, illite, kaolinite, montmorillonite, palygorskite groups, talc, mica, wollastonite, and various other clays, can be readily treated by the present invention.

The products of the invention may be used as fillers in plastics and elastomers viz., as fillers in a rubber matrix, for tire applications to increase the grip of the tread and abrasion resistance. They are also useful in ceramics to improve strength and durability. Further, they are useful as abrasives in industrial products such as abrasive cleaners and sandpaper coatings.

As disclosed in *McConnell et al*, U.S. Pat. No. 4,381,948, a sample of kaolin clay was found by chemical analysis to contain a small amount of organic matter. This organic matter is a source of carbon. However, an external source of carbon such as graphite may be employed if desired.

The reaction is conducted at temperatures effective to reduce organic material present to produce coke and to bring about the reaction of the silicon of the clay with the coke to form silicon carbide, suitably at temperatures of about 1000° C. or higher, e.g., from about 1000° C. to about 1150° C. and in the presence of gaseous hydrogen. The hydrogen may be essentially pure or may be impure, containing inert constituents; for example it may contain an inert gas carrier such as argon. It should be noted that nitrogen is not inert at these temperature conditions and can cause nitridation rather than carbide formation; therefore the presence of nitrogen in substantial amounts should be avoided.

DETAILED DESCRIPTION

In one embodiment of the present invention the materials and conditions used were as shown in the following example which is intended to be illustrative and not limitative of the invention.

EXAMPLE 1

As starting material, a fine particle size kaolin (about 98% by weight under 1 micrometer E.S.D.) having a carbon content by elemental analysis of 0.5% by weight, was employed. This feed material was of the type used as a calciner feed in a process of the kind disclosed in *McConnell et al*, U.S. Pat. No. 4,381,948. This material was treated at 1000° C. in a pure hydrogen atmosphere, for 20 to 40 minutes. The resultant product was found to be charcoal gray in color and would not disperse in water—as an untreated kaolin would. Neither would the thus treated product disperse in organics such as acetone, linseed oil or toluene. The ESCA spectra of the product showed the presence of silicon carbide on the surface of the kaolin. The brightness was determined as 36 on the G.E. scale as compared to 90.5 where the same feed was heated in air. Bruening abrasion was also determined for this hydrogen-treated product, and found to be of the order of 2 times that of a kaolin treated in air at the same temperature. (A method for determining Bruening abrasion is set forth in U.S. Pat. No. 4,678,517.)

The product is found to be a layered lattice silicate, e.g., kaolin, which is surface bound to the silicon carbide. The product is useful in typical filler applications and is capable of yielding improvements in the mechanical and other useful properties of the filled system.

EXAMPLE 2

A fully calcined kaolin, Alphatex, was milled with 1% polybutadiene polymer (to act as a source of carbon). The milled material was screw fed into a rotary furnace heated to 1050° C. in a $H_2$ atmosphere. The product was reacted under these conditions for 40 minutes. Upon emptying from the furnace, the normally white (92 GE brightness) material was gray in color. The abrasion, and dispersion characteristics were altered as was the product described in Example 1.

EXAMPLE 3

Calcined kaolin is reported to have a siliceous layer which is expelled from the structure in a solid state reaction at temperatures above 1000° C., see "Principles of Solid State Chemistry" by P. O. Budnikov and A. M. Ginstling, pp. 373–377, translated by Kenneth Shaw, Copyright 1968, Maclaren and Sons Limited. This siliceous layer is the source of the surface silicon to form the very uniform coating of silicon carbide at 1050°–1150° C.

When kaolin is calcined at temperatures in excess of 1000° C., certain other phases are also formed, see FIG. 158, page 376 of said textbook, and two of these phases can be identified using X-ray diffraction analysis. These phases are mullite ($3Al_2O_3 2SiO_2$) and gamma $Al_2O_3$.

Upon comparison of X-ray diffraction patterns from calcined kaolin reacted at 1100° C. in air and the same kaolin reacted in $H_2$, the two peaks assigned to mullite c.f. $Al_2O_3$, in the air calcined kaolin are not present in the $H_2$ calcined kaolin. In order for mullite to form, 2 moles of silica are required per mole of mullite formed.

Since the silica normally available to produce the mullite phase is utilized in the formation of the silicon carbide phase, the mullite can no longer form.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for forming silicon carbide on the surface of a layered lattice silicate having the general formula $E_iM_xSi_yO_n(OH)_m$, where M is Al, Mg, or Fe; x=2 to 6; y=2 to 8; n=2 to 20; m=0 to 8; and $E_1$ is one or more exchangeable ions, which comprises:

reacting said layered lattice silicate in particulate form in the presence of a carbon source with a gaseous reactant comprising hydrogen as the essential active ingredient, and in the absence of substantial amounts of nitrogen, at temperature in the range of about 1000° to 1150° C. to form silicon carbide at said surface.

2. A method in accordance with claim 1 in which the carbon occurs naturally in the layered lattice silicate in the form of organic impurities.

3. A method in accordance with claim 1 in which an external source of carbon is employed.

4. A method in accordance with claim 2 or 3, wherein said reaction is conducted at about 1000° C.

5. A method in accordance with claim 2 or 3, wherein said silicate is a kaolin clay.

6. A method in accordance with claim 2 or 3, where said reaction is conducted in a rotary furnace.

7. A method in accordance with claim 1, in which the reaction time is in the range of about 5 to about 75 minutes.

* * * * *